United States Patent
Taherzadeh Boroujeni et al.

(10) Patent No.: US 11,706,790 B2
(45) Date of Patent: Jul. 18, 2023

(54) GROUP SELECTION FOR UPLINK TRANSMISSION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 17/125,687

(22) Filed: Dec. 17, 2020

(65) Prior Publication Data

US 2021/0195609 A1 Jun. 24, 2021

Related U.S. Application Data

(60) Provisional application No. 62/951,777, filed on Dec. 20, 2019.

(51) Int. Cl.
*H04W 72/08* (2009.01)
*H04L 5/00* (2006.01)
(Continued)

(52) U.S. Cl.
CPC .......... *H04W 72/543* (2023.01); *H04L 5/0048* (2013.01); *H04W 64/00* (2013.01); *H04W 72/0446* (2013.01)

(58) Field of Classification Search
CPC ........... H04W 72/087; H04W 72/0446; H04W 64/00; H04L 5/0048
See application file for complete search history.

(56) References Cited

U.S. PATENT DOCUMENTS

| 10,009,864 B2* | 6/2018 | Etemad ................. H04L 5/001 |
| 2018/0124787 A1* | 5/2018 | Wang .................. H04L 27/2613 |
| 2018/0199360 A1 | 7/2018 | Lin et al. |

FOREIGN PATENT DOCUMENTS

| GB | 2582788 | * | 4/2019 | ............ H04W 64/00 |
| WO | 2019164430 A1 | | 8/2019 | |

OTHER PUBLICATIONS

Huawei, et al., "Considerations on Timing Advance Design in NR", 3GPP Draft, 3GPP TSG RAN WG1 Meeting #89, R1-1706929, 3rd Generation Partnership Project (3GPP), Mobile Competence Centre, 650, Route Des Lucioles, F-06921 Sophia-Antipolis Cedex, France, vol. RAN WG1, No. Hangzhou, China, May 15, 2017-May 19, 2017, May 8, 2017 (May 8, 2017), XP051263391, 3 Pages, Retrieved from the Internet: URL: http://www.3gpp.org/ftp/tsg_ran/WG1_RL1/TSGR1_89/Docs/. [retrieved on May 8, 2017] the whole document.

(Continued)

*Primary Examiner* — Muthuswamy G Manoharan
(74) *Attorney, Agent, or Firm* — Patterson & Sheridan, L.L.P/Qualcomm Incorporated

(57) ABSTRACT

Certain aspects of the present disclosure provide a method for wireless communication by a wireless device. The method generally includes selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria. The multiple TRPs of the group of TRPs are selected such that levels of communication delay between each of the multiple TRPs and the UE are within a defined delay range. The method further includes communicating on an uplink using a single timing advance between the UE and the group of TRPs.

27 Claims, 6 Drawing Sheets

(51) Int. Cl.
*H04W 64/00* (2009.01)
*H04W 72/543* (2023.01)
*H04W 72/0446* (2023.01)

(56) References Cited

OTHER PUBLICATIONS

International Search Report and Written Opinion—PCT/US2020/065984—ISA/EPO—dated May 4, 2021.

* cited by examiner

GROUP SELECTION FOR UPLINK TRANSMISSION

CROSS-REFERENCE TO RELATED APPLICATIONS

This application claims priority to U.S. Provisional Patent Application No. 62/951,777, filed Dec. 20, 2019. The content of the aforementioned application is hereby incorporated by reference in its entirety.

BACKGROUND

Field of the Disclosure

Aspects of the present disclosure relate to wireless communications, and more particularly, to techniques for uplink transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between devices in a wireless network.

Certain aspects provide a method for wireless communication by a wireless device. The method generally includes selecting multiple transmission reception points (TRPs) of a plurality of TRPs to form a group of TRPs based on information indicative of relative positions between a user equipment (UE) and each of the plurality of TRPs, such that the relative positions between the UE and the multiple TRPs satisfy a criteria. The multiple TRPs of the group of TRPs are selected such that levels of communication delay between each of the multiple TRPs and the UE are within a defined delay range. The method further includes communicating on an uplink using a single timing advance between the UE and the group of TRPs.

Certain aspects provide a wireless device comprising a memory and a processor coupled to the memory. The processor and memory are configured to select multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria. The multiple TRPs of the group of TRPs are selected such that levels of communication delay between each of the multiple TRPs and the UE are within a defined delay range. The processor and memory are further configured to communicate on an uplink using a single timing advance between the UE and the group of TRPs.

Certain aspects provide a wireless device. The wireless device includes means for selecting multiple transmission reception points (TRPs) of a plurality of TRPs to form a group of TRPs based on information indicative of relative positions between a user equipment (UE) and each of the plurality of TRPs, such that the relative positions between the UE and the multiple TRPs satisfy a criteria. The multiple TRPs of the group of TRPs are selected such that levels of communication delay between each of the multiple TRPs and the UE are within a defined delay range. The wireless device further includes means for communicating on an uplink using a single timing advance between the UE and the group of TRPs.

Certain aspects provide a non-transitory computer-readable medium that comprises instructions that when executed by a wireless device, cause the wireless device to perform a method of wireless communication. The method generally includes selecting multiple transmission reception points (TRPs) of a plurality of TRPs to form a group of TRPs based on information indicative of relative positions between a UE) and each of the plurality of TRPs, such that the relative positions between the UE and the multiple TRPs satisfy a criteria. The multiple TRPs of the group of TRPs are selected such that levels of communication delay between each of the multiple TRPs and the UE are within a defined delay range. The method further includes communicating on an uplink using a single timing advance between the UE and the group of TRPs.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
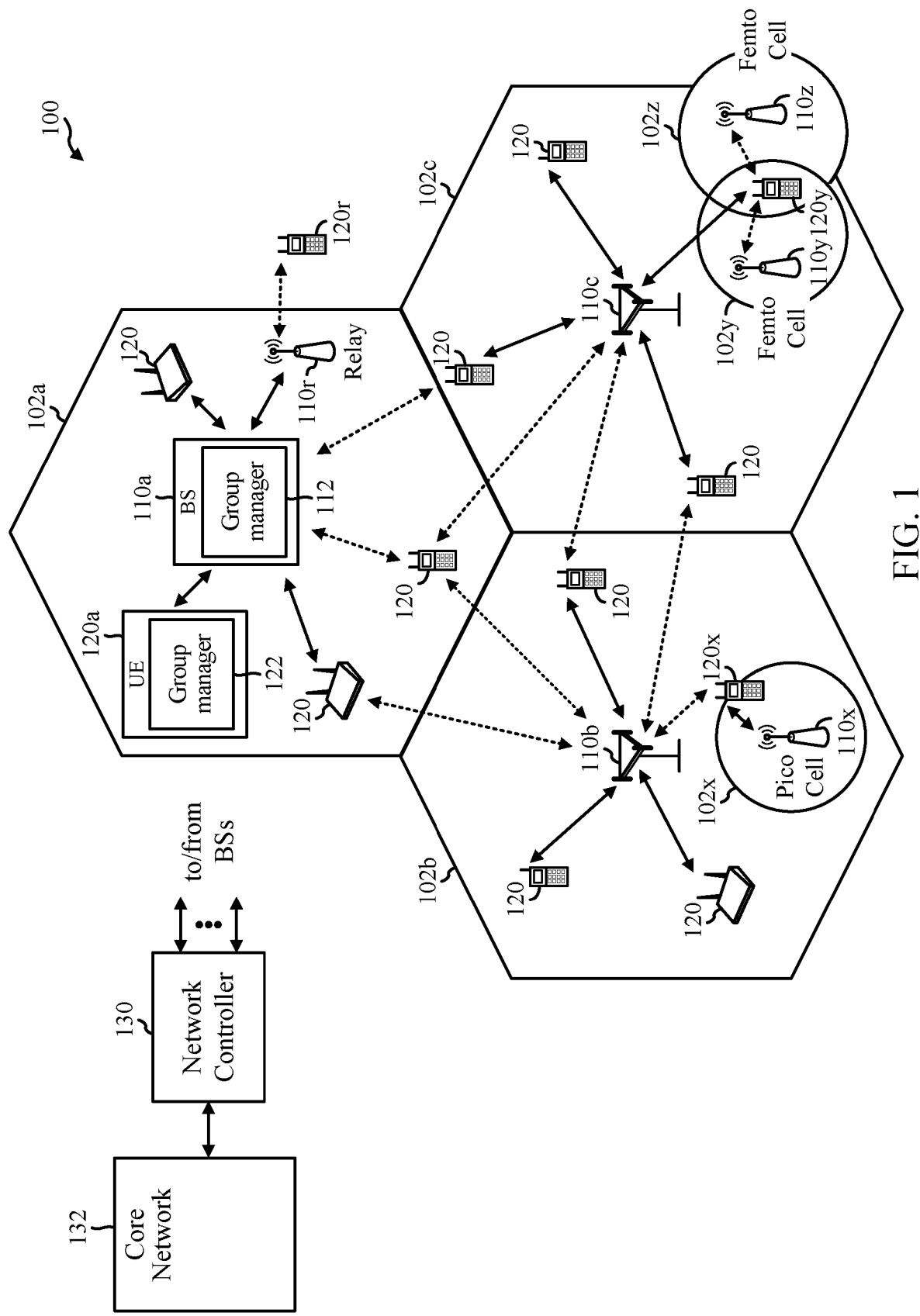
FIG. 1 is a block diagram conceptually illustrating an example telecommunications system, in accordance with certain aspects of the present disclosure.

Aspects of the present disclosure provide apparatus, methods, processing systems, and computer readable mediums for selecting a subset of TRPs from a set of TRPs, or multiple TRPs from a plurality of TRPs, to form a group of TRPs for receiving uplink transmission from a UE. Though certain aspects are described with respect to grouping TRPs for uplink transmission, it should be understood that the aspects may similarly be applied to grouping other suitable wireless devices, such as BSs, DUs, etc. For example, in certain aspects, a TRP may refer to a BS, a DU, etc. In certain aspects, a TRP may refer to an antenna array (such as associated with a BS or DU) with one or more antenna elements available to the network located at a specific geographical location for a specific area. In such aspects, where it is described as the TRP determining something or performing some type of processing, this may refer to the associated BS or DU performing such action.

A UE is typically configured to apply a timing advance (TA) to the timing of an uplink transmission from the UE to a TRP, such as to account for round trip delay between the UE and the TRP and/or to achieve uplink synchronization between the UE and the TRP. A round trip delay may be calculated as the time between when the UE sends a signal to the TRP and when the UE receives a response from the TRP with respect to the signal sent, or vice versa. Uplink synchronization may refer to the TRP and UE using a consistent timing by which to align time resources (e.g., frames, subframes, slots, etc.) for communication on the uplink. For example, a TA can be used to control uplink signal timing. Based on a TA, a UE may delay (e.g., send late) an uplink transmission or advance the uplink transmission (e.g., send early) by some amount as compared to the scheduled time for the uplink transmission (e.g., as scheduled in an uplink grant received by the UE from the TRP, such as in a physical downlink control channel (PDCCH)). For example, the TA may be set so that the uplink transmission is received at the TRP from the UE at the scheduled time for the uplink transmission by accounting for delay between the TRP and the UE, such that the timing of communication of the TRP and the UE on the uplink are synchronized.

In certain aspects, the TA is determined by the TRP and communicated to the UE. For example, the TRP may determine the TA after receiving a physical random access channel (PRACH) as part of a random access procedure from the UE. Further, the TRP may transmit an indication of the TA to the UE as part of a message (e.g., MSG2) of the random access procedure. In certain aspects, the TA may be the value of the delay or advance. In certain aspects, the TRP sends the actual value of the TA to the UE. In certain aspects, the TRP sends an index value to the UE, and the UE is configured with a mapping to map the index value to an actual value (e.g., a backoff parameter value in ms) of the TA.

In certain aspects, a UE is configured for multi-TRP uplink transmission, where the UE sends uplink transmission(s) to a plurality of TRPs. However, based on the position/location geographically of the UE with respect to each TRP, the round trip delay between the UE and each of the plurality of TRPs may have a large difference. For example, the UE may be much further from one TRP than another, or there may be different obstacles present between the UE and one TRP and not between the UE and the other TRP.

Accordingly, in certain cases, for such multi-TRP uplink transmission, applying a single TA by the UE for uplink transmission to each of the plurality of TRPs may degrade reception of the uplink transmission at some of the plurality of TRPs because some of the plurality of TRPs may not receive the uplink transmission at a time that is synchronized with the UE or expected. For example, each TRP may be receiving uplink transmission from a plurality of UEs, and if the TRP receives an uplink transmission from a UE that does not align with the scheduled time for the transmission, such as based on the UE using a sub-optimal TA, the uplink transmission from the UE may be received along with transmissions from other UEs causing interference. In particular, the TRP may not be able to properly separate the multiple transmissions from the multiple UEs if the multiple transmissions are not all aligned in time as received at the TRP.

Further, in certain cases, for such multi-TRP uplink transmission, applying different TAs by the UE for uplink transmission to the different TRPs results in the UE having to transmit multiple uplink signals/transmissions for the plurality of TRPs, which uses more resources of the UE than transmitting a single uplink signal/transmission using a single TA that is received by the plurality of TRPs.

Accordingly, certain aspects herein provide for grouping TRPs based on the relative position between the TRPs and the UE, such that the UE can utilize a single uplink transmission to the group of TRPs using a single TA. For example, multiple TRPs of a plurality of TRPs are selected to form a group of TRPs such that levels of communication delay between each of the multiple TRPs and the UE are within a defined delay range. Advantageously, this helps promote that the uplink transmission is received at the group of TRPs at approximately the same time based on them having relative positions within a range, thus maintaining uplink synchronization, as opposed to the uplink transmission also being received and processed by other TRPs at different times based on them having different relative positions outside of the range.

The following description provides examples of grouping devices for uplink transmission, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless networks and radio technologies. While aspects may be described herein using terminology commonly associated with 3G, 4G, and/or 5G wireless technologies, aspects of the present disclosure can be applied in other generation-based communication systems, including later technologies.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, 5G NR RAT networks may be deployed.

5G NR may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR may support beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be a 5G NR network. As shown in FIG. 1, the wireless communication network 100 may be in communication with a core network 132. The core network 132 may be in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a cell may, which may be stationary or may move according to the location of a mobile BS 110. In some examples, the BSs 110 may be interconnected to one another and/or to one or more other BSs 110 or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r) that receives a transmission of data and/or other information from an upstream station (e.g., a BS 110a or a UE 120r) and send a transmission of the data and/or other information to a downstream station (e.g., a UE 120 or a BS 110), or that relays transmissions between UEs 120 to facilitate communication between devices.

According to certain aspects, the UEs 120 may be configured for uplink transmission to a group of BSs 110. As shown in FIG. 1, the UE 120a has a group manager that may be configured for selecting TRPs for uplink transmission, according to aspects described herein. In another example, as shown in FIG. 1, the BS 110a has a group manager that may be configured for selecting TRPs for uplink transmission, according to aspects described herein.

Figure 2:
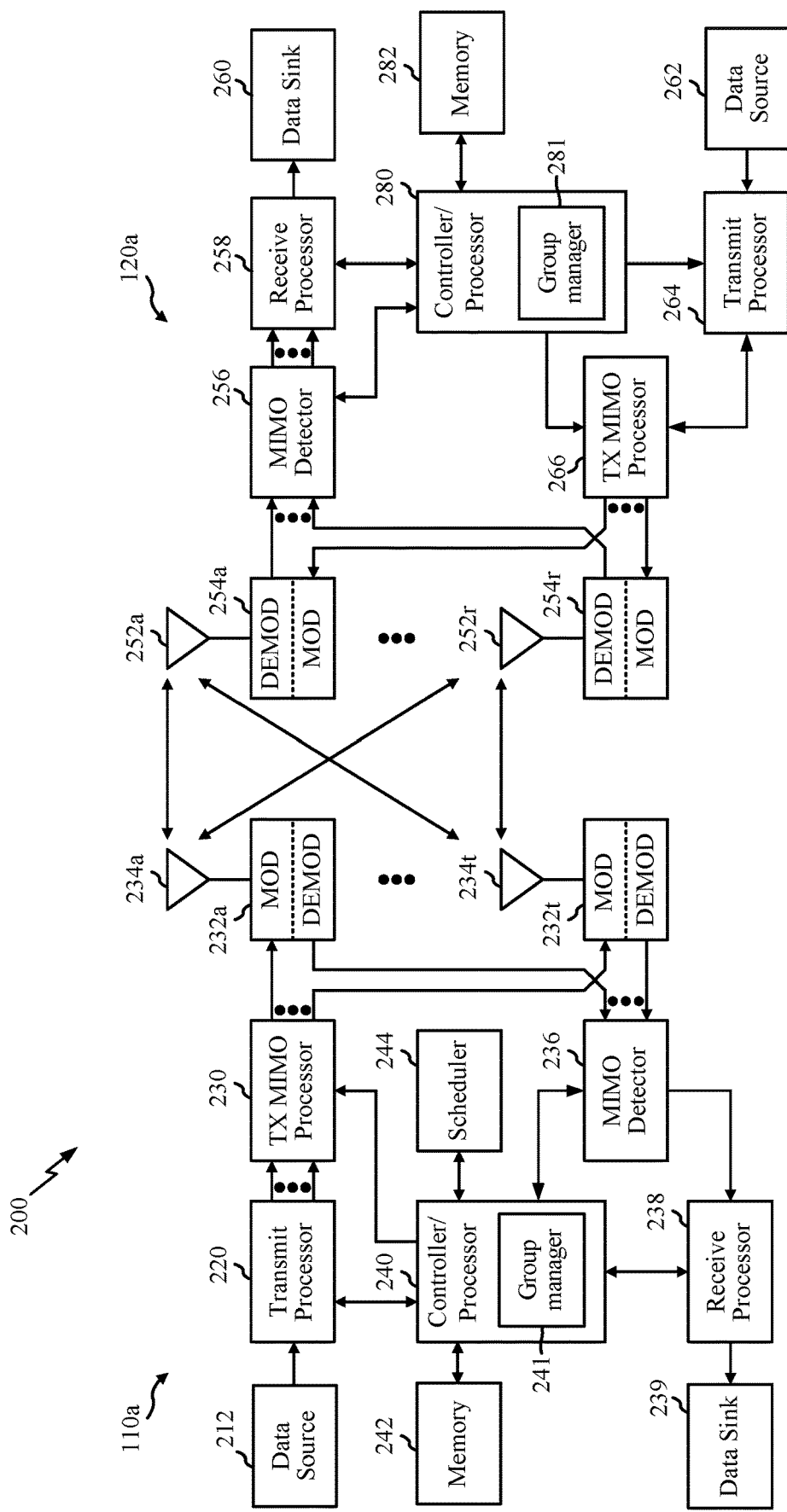
FIG. 2 is a block diagram conceptually illustrating a design of an example base station (BS) and user equipment (UE), in accordance with certain aspects of the present disclosure.

FIG. 2 illustrates example components of BS 110a and UE 120a (as depicted in FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120a, the antennas 252a through 252r may receive the downlink signals from the BS 110a and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a through 254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the processor 240 at the BS 110a has a group manager that may be configured for selecting TRPs for uplink transmission, according to aspects described herein. As shown in FIG. 2, the processor 280 at the UE 120a has a group manager that may be configured for selecting TRPs for uplink transmission, according to aspects described herein. The memories 242 and 282 may store data and program codes for BS 110a and UE 120a, respectively. A scheduler 244 may schedule UEs for data transmission on the downlink and/or uplink.

NR may utilize orthogonal frequency division multiplexing (OFDM) with a cyclic prefix (CP) on the uplink and/or downlink and/or single-carrier frequency division multiplexing (SC-FDM) on the uplink. NR may support half-duplex operation using time division duplexing (TDD). OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The NR resource block (RB) may be 12 consecutive frequency subcarriers. NR may support a base subcarrier spacing (SCS) of 15 KHz and other SCS may be defined with respect to the base SCS (e.g., 30 kHz, 60 kHz, 120 kHz, 240 kHz, etc.). The system bandwidth may also be partitioned into subbands. For example, a subband may cover multiple RBs.

Figure 3:
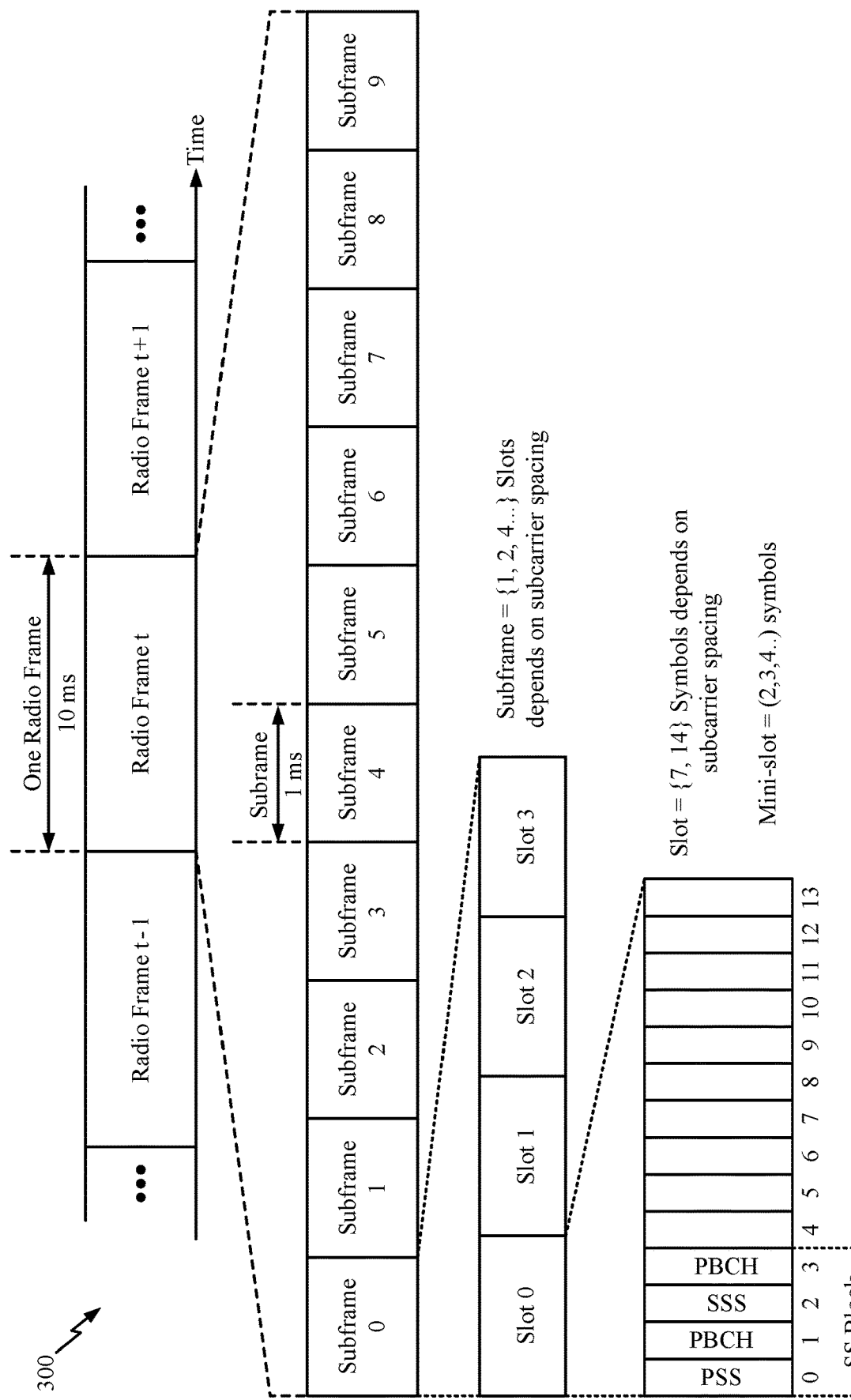
FIG. 3 illustrates an example of a frame format for a new radio (NR) system, in accordance with certain aspects of the present disclosure.

In NR, a subframe is 1 ms, but the basic TTI is referred to as a slot. FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In certain systems, a user equipment (UE) may be able to transmit uplink signals using multiple antennas, beams, antenna panels (e.g., antenna arrays). The uplink transmissions may be to the serving base station (BS). The uplink transmissions may allow increased throughput (e.g., by simultaneously or concurrently transmitting data to the BS using the multiple antennas, beams, and/or panels) and/or increased reliability (e.g., by sending the same information from the multiple antennas, beams, and/or panels). Such transmissions may be referred to as multi-panel uplink transmissions.

In certain systems, such as new radio (e.g., 5G NR systems), multi-panel uplink transmission may be configured for physical uplink shared channel (PUSCH) and/or sounding reference signal (SRS) transmissions by the UE. In some examples, the UE is configured with one or more SRS resource sets configuring SRS resources for SRS transmission. Each SRS resource set may be associated with a UE antenna panel for both codebook-based (e.g., beamformed) and non-codebook based (e.g., non-beamformed) PUSCH transmission. In some examples, the SRS resource indicator (SRI) field in downlink control information (DCI) may be used to indicate (by the BS) and select (by the UE) SRS resources from the configured SRS resource sets. For example, the BS and UE may be configured with a table or mapping of the SRI field (e.g., SRI values) to which SRS resource from which SRS resource set is to be used for a multi-panel uplink transmission. In some examples, the SRI in the DCI may indicate multiple SRS resources from one SRS resource set. In some examples, of the multiple SRS resources indicated by the BS, the UE may select one to use for uplink transmission.

Example Group Selection for Uplink Transmission

In certain aspects, a UE or a network element (e.g., CN, a TRP, etc.) is configured to select multiple TRPs of a plurality of TRPs to include in a group of TRPs. Further, the UE is then configured to transmit an uplink transmission to the group of TRPs using a timing advance. Accordingly, a single uplink transmission transmitted using a single timing advance by the UE is received by each of the multiple TRPs of the group of TRPs to which the single uplink transmission is directed.

In certain aspects, the multiple TRPs are selected such that levels of communication delay between each of the multiple TRPs and the UE are within a defined delay range (e.g., defined range of TA, defined propagation delay, etc.).

In certain aspects the multiple TRPs are selected based on a relative position between each of the multiple TRPs and the UE satisfying a criteria. In certain aspects, if the criteria is met, the levels of communication delay are within the defined range. For example, a corresponding relative position between the UE and each of a plurality of TRPs is determined. In certain aspects, the relative position is a relative distance.

In certain aspects, the criteria is a maximum variation among the relative positions of the multiple TRPs. In certain aspects, the maximum variation means that the maximum relative position of the multiple TRPs minus the minimum relative position of the multiple TRPs satisfies a threshold. In certain aspects, the threshold is statically configured at the UE or network. In certain aspects, the network dynamically determines the threshold. In certain aspects, the network configures the UE with the threshold, such as using downlink control information (DCI) or a medium access control-control element (MAC-CE). In certain aspects, the network signals the threshold to the UE by indicating a threshold value among a set of configured and/or predefined threshold values.

In certain aspects, the multiple TRPs are selected from the plurality of TRPs such as to maximize the number of the plurality of TRPs in the group of TRPs, while still satisfying the criteria.

In certain aspects, the relative position is based on location information of the UE and each of the plurality of TRPs. In certain aspects, the location information is an angle of arrival of signals at the UE. In certain aspects, the UE may determine its location information based on a positioning system, such as GPS, A-GPS, GLONASS, etc. Similarly, in certain aspects, a TRP may determine its location information based on a positioning system, or the location may be configured, such as based on the TRP being stationary.

In certain aspects, the network, via a serving TRP, may communicate the location information of the plurality of TRPs to the UE, which the UE may utilize with its own location information to determine the relative positions. The UE may then utilize that information to make the selection of the group of TRPs, or transmit such information to the network, such as via a serving TRP, for the network to make the selection.

In certain aspects, the UE may communicate its location information to the network via a serving TRP, which the network may utilize with the location information of the plurality of TRPs to determine the relative positions. The network may then utilize that information to make the selection of the group of TRPs, or transmit such information to the UE, such as via a serving TRP, for the UE to make the selection.

In certain aspects, a UE is configured to receive a downlink position reference signal (PRS) from a TRP (e.g., a serving TRP) to enable positioning by the UE, such as for the UE to determine its relative position with respect to the TRP. For example, the PRS may be used by the UE to estimate path delays from TRPs or reference signal time difference measurement (RSTD). Thus, the UE can determine its relative position with respect to a plurality of TRPs. For example, the relative position may be the RSTD. In certain aspects, the UE reports the RSTDs of the plurality of TRPs to the network, such as by transmitting information indicative of the RSTDs of the plurality of TRPs to the serving TRP.

In certain aspects, the multiple TRPs are selected based on a relative position between each of the multiple TRPs and the UE satisfying the criteria and based on a measure of signal quality of each of the plurality of TRPs. For example, the UE or network may determine a signal quality (e.g., CQI, RSSI, RSRP, RSRQ, etc.) associated with each of the plurality of TRPs, such as by measuring a signal (e.g., reference signal) transmitted by each of the plurality of TRPs at the UE, or measure a signal transmitted by the UE at each of the plurality of TRPs. In certain aspects, the UE communicates the measures of signal quality to the network, such as to a serving TRP. In certain aspects, the network communicates the measures of signal quality to the UE. In certain aspects, the UE or network only selects TRPs to include in the group of TRPs that have a signal quality that satisfies a threshold.

In certain aspects, the UE or network first selects a TRP of the plurality of TRPs have a highest signal quality among the plurality of TRPs to include in the group of TRPs. In certain such aspects, the UE or network then selects remaining TRPs of the plurality of TRPs to include in the group of TRPs based on a relative position between each of the multiple TRPs and the UE satisfying the criteria. For example, where the criteria is a maximum variation, the maximum variation is also with respect to the relative position of the first selected TRP.

Figure 4:
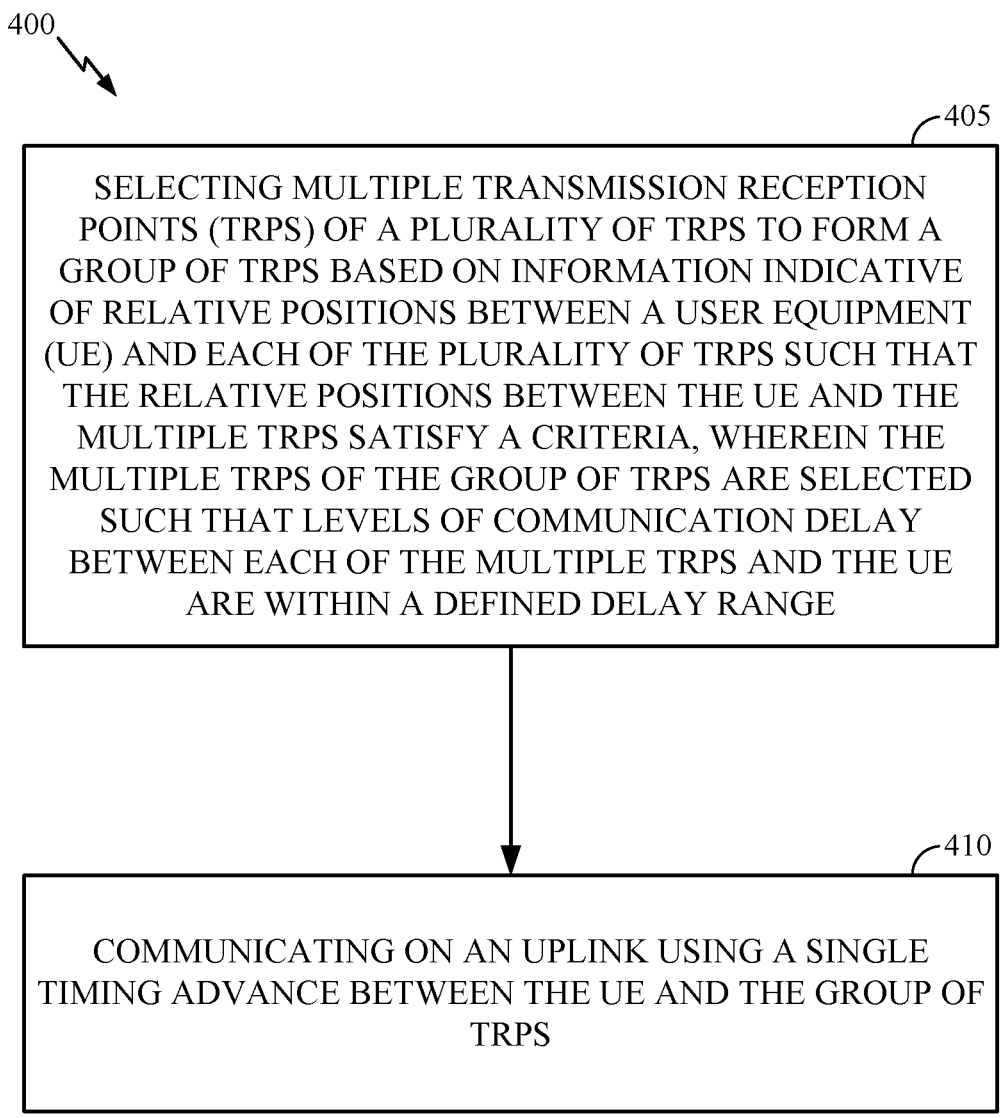
FIG. 4 is a flow diagram illustrating example operations by a wireless device for wireless communication, in accordance with certain aspects of the present disclosure.

FIG. 4 is a flow diagram illustrating example operations 400 for wireless communication by a wireless device, in accordance with certain aspects of the present disclosure. In certain aspects, the operations 400 may be performed, for example, by a UE (e.g., such as the UE 120a in the wireless communication network 100). Operations 400 may be implemented as software components that are executed and run on one or more processors (e.g., processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., processor 280) obtaining and/or outputting signals.

In certain aspects, the operations 400 may be performed, for example, by a BS (e.g., such as the BS 110a in the wireless communication network 100). Operations 400 may be implemented as software components that are executed and run on one or more processors (e.g., processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., processor 240) obtaining and/or outputting signals.

The operations 400 may begin, at 405, by selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the multiple TRPs of the group of TRPs are selected such that levels of communication delay between each of the multiple TRPs and the UE are within a defined delay range.

At 410, the wireless device communicates on an uplink using a single timing advance between the UE and the group of TRPs In certain aspects of operations 400, the wireless device is the UE, and communicating on the uplink comprises transmitting an uplink transmission to the group of TRPs using the single timing advance.

In certain aspects of operations 400, the wireless device is a first TRP of the group of TRPs, and communicating on the uplink comprises receiving an uplink transmission for the group of TRPs transmitted using the single timing advance from the UE.

In certain aspects of operations 400, the wireless device further receives from the UE the information indicative of the relative positions.

In certain aspects of operations 400, the information indicative of the relative positions comprises a location of the UE and locations of each of the plurality of TRPs. In certain such aspects, the information indicative of the relative positions is based on one or more of GPS location information of the UE, network location information of the UE, or angle of arrival information of the UE.

In certain aspects of operations 400, selecting the multiple TRPs of the group of TRPs is further based on information indicative of signal qualities between the UE and each of the plurality of TRPs. In certain such aspects, the information indicative of signal qualities comprises one or more of reference signal received power (RSRP), received signal strength indicator (RSSI), reference signal received quality (RSRQ), or channel quality indicator (CQI).

In certain aspects of operations 400, the information indicative of the relative positions comprises reference signal time difference measurements (RSTDs) between the UE and each of the plurality of TRPs. In certain such aspects, the wireless device is the UE, and the wireless device further receives positioning reference signals (PRSs) from the plurality of TRPs and determining the RSTDs based on the received PRSs. In other certain such aspects, the wireless device is a first TRP of the plurality of TRPs, and the wireless device further receives the RSTDs from the UE. In other certain such aspects, the criteria is a defined maximum difference between RSTDs of the multiple TRPs of the group of TRPs. In certain such other aspects, the defined maximum difference between RSTDs is statically configured at the wireless device. In certain such other aspects, the defined maximum difference between RSTDs is dynamically configured at the wireless device. In certain such other aspects, an indication of the defined maximum difference between RSTDs is received at the wireless device. In certain such aspects, the indication is received via one of a downlink control information (DCI) or a medium access control—control element (MAC-CE). In certain aspects, the criteria is a defined maximum difference between RSTDs of the multiple TRPs of the group of TRPs including a first TRP selected based on information indicative of signal quality between the UE and the first TRP.

In certain aspects of operations 400, multiple TRPs are selected to maximize a number of the plurality of TRPs that satisfy the criteria.

In certain aspects of operations 400, a first TRP is selected for the group of TRPs based on the first TRP having a signal quality between the UE and the first TRP that satisfies a threshold, and remaining TRPs of the multiple TRPs are selected to maximize a number of the plurality of TRPs that satisfy the criteria. In certain such aspects, the threshold is a highest signal quality among the plurality of TRPs.

Figure 5:
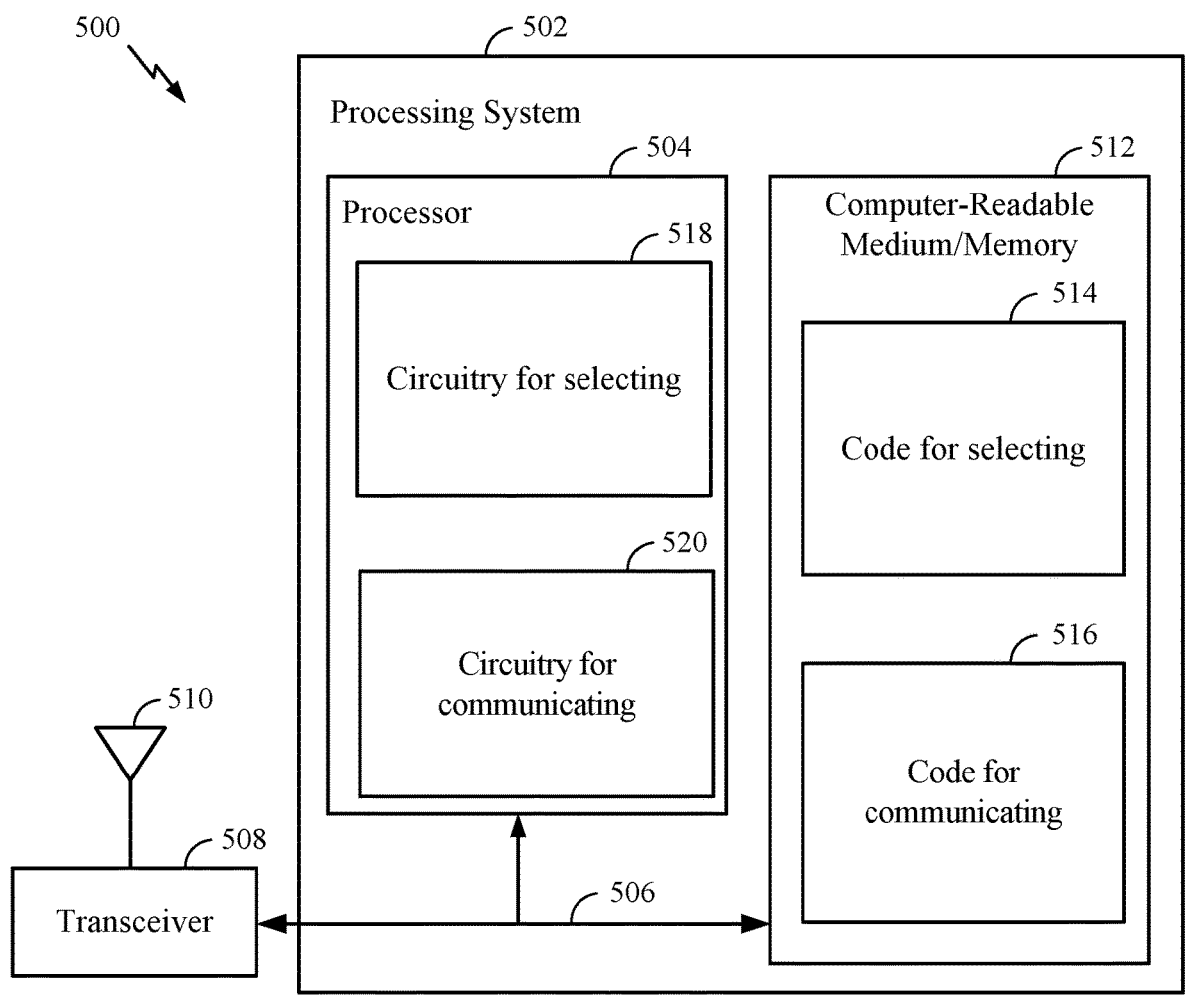
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components) configured to perform operations for the techniques disclosed herein, such as the operations illustrated in FIG. 4. The communications device 500 includes a processing system 502 coupled to a transceiver 508. The transceiver 508 is configured to transmit and receive signals for the communications device 500 via an antenna 510, such as the various signals as described herein, for example, receiving relative timing information and/or transmitting a multi-panel uplink transmission. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIG. 4, or other operations for performing the various techniques discussed herein for a using multiple timing advances for simultaneous uplink reception. In certain aspects, computer-readable medium/memory 512 stores code 514 for selecting; and code 516 for communicating. In certain aspects, the processor 504 has circuitry configured to implement the code stored in the computer-readable medium/memory 512. The processor 504 includes circuitry 518 for selecting; and circuitry 520 for communicating.

Figure 6:
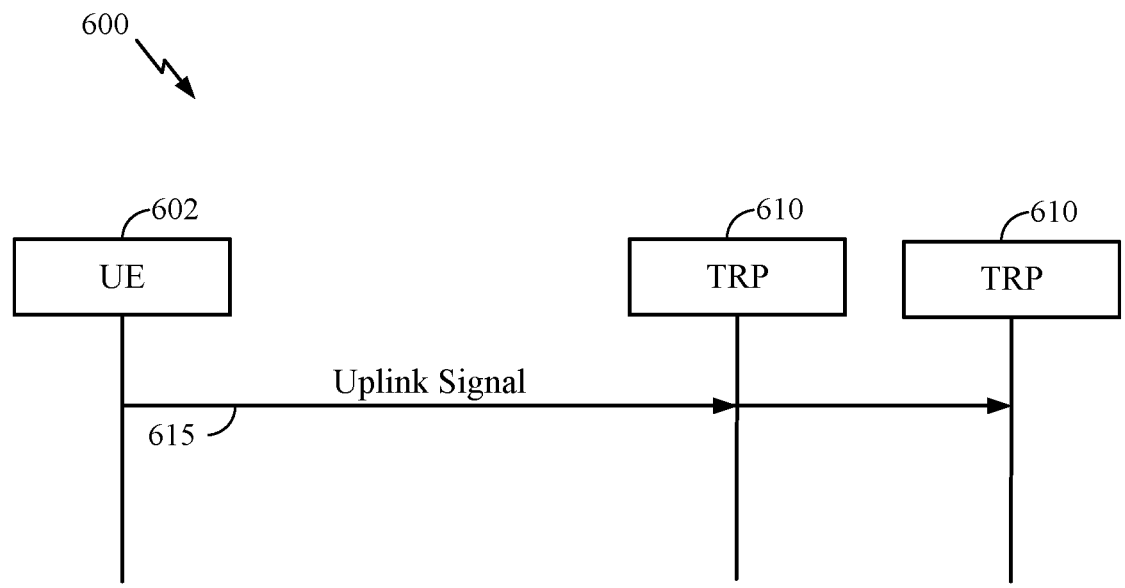
FIG. 6 illustrates a signal flow diagram of communication by a UE with multiple TRPs on an uplink using a single timing advance (TA), in accordance with certain aspects of the present disclosure.

FIG. 6 illustrates a signal flow diagram 600 of communication by a UE with multiple TRPs on an uplink using a single TA. As shown, UE 602 sends a signal 615 on an uplink to TRPs 610 in a group of TRPs selected according to the aspects discussed herein.

EXAMPLE ASPECTS

In a first example aspect, method of wireless communication by a wireless device, the method comprising: selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the multiple TRPs of the group of TRPs are selected such that levels of communication delay between each of the multiple TRPs and the UE are within a defined delay range; and communicating on an uplink using a single timing advance between the UE and the group of TRPs.

In a second example aspect, in combination with the first example aspect, wherein the wireless device is the UE, and wherein communicating on the uplink comprises transmitting an uplink transmission to the group of TRPs using the single timing advance.

In a third example aspect, in combination with the first example aspect, wherein the wireless device is a first TRP of the group of TRPs, and wherein communicating on the uplink comprises receiving an uplink transmission for the group of TRPs transmitted using the single timing advance from the UE.

In a fourth example aspect, in combination with one or more of the first through third aspects, further comprising receiving from the UE the information indicative of the relative positions.

In a fifth example aspect, in combination with one or more of the first through fourth aspects, wherein the information indicative of the relative positions comprises a location of the UE and locations of each of the plurality of TRPs.

In a sixth example aspect, in combination with one or more of the first through fifth aspects, wherein the information indicative of the relative positions is based on one or more of GPS location information of the UE, network location information of the UE, or angle of arrival information of the UE.

In a seventh example aspect, in combination with one or more of the first through sixth aspects, wherein selecting the multiple TRPs of the group of TRPs is further based on information indicative of signal qualities between the UE and each of the plurality of TRPs.

In an eighth example aspect, in combination with one or more of the first through seventh aspects, wherein the information indicative of signal qualities comprises one or more of reference signal received power (RSRP), received signal strength indicator (RSSI), reference signal received quality (RSRQ), or channel quality indicator (CQI).

In a ninth example aspect, in combination with one or more of the first through eighth aspects, wherein the information indicative of the relative positions comprises reference signal time difference measurements (RSTDs) between the UE and each of the plurality of TRPs.

In a tenth example aspect, in combination with one or more of the first through the ninth aspect, wherein the wireless device is the UE, and further comprising: receiving positioning reference signals (PRSs) from the plurality of TRPs and determining the RSTDs based on the received PRSs.

In an eleventh example aspect, in combination with one or more of the first through the ninth aspect, wherein the wireless device is a first TRP of the plurality of TRPs, and further comprising: receiving the RSTDs from the UE.

In an twelfth example aspect, in combination with one or more of the first through eleventh aspects, wherein the criteria is a defined maximum difference between RSTDs of the multiple TRPs of the group of TRPs.

In a thirteenth example aspect, in combination with the twelfth aspect, wherein the defined maximum difference between RSTDs is statically configured at the wireless device.

In a fourteenth example aspect, in combination with the twelfth aspect, wherein the defined maximum difference between RSTDs is dynamically configured at the wireless device.

In a fifteenth example aspect, in combination with the twelfth aspect, wherein an indication of the defined maximum difference between RSTDs is received at the wireless device.

In a sixteenth example aspect, in combination with the fifteenth aspect, wherein the indication is received via one of a downlink control information (DCI) or a medium access control-control element (MAC-CE).

In a seventeenth example aspect, in combination with the twelfth aspect, wherein the criteria is a defined maximum difference between RSTDs of the multiple TRPs of the group of TRPs including a first TRP selected based on information indicative of signal quality between the UE and the first TRP.

In an eighteenth example aspect, in combination with one or more of the first through seventeenth aspects, wherein multiple TRPs are selected to maximize a number of the plurality of TRPs that satisfy the criteria.

In an nineteenth example aspect, in combination with one or more of the first through eighteenth aspects, wherein a first TRP is selected for the group of TRPs based on the first TRP having a signal quality between the UE and the first TRP that satisfies a threshold, and wherein remaining TRPs of the multiple TRPs are selected to maximize a number of the plurality of TRPs that satisfy the criteria.

In a twentieth example aspect, in combination with the nineteenth aspect, wherein the threshold is a highest signal quality among the plurality of TRPs.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B (NB) and/or a NB subsystem serving this coverage area, depending on the context in which the term is used. In an LTE or LTE-A network, a set of one or more base stations may define an eNodeB (eNB). In NR systems, the term "cell" and next generation NodeB (gNB or gNodeB), NR BS, 5G NB, access point (AP), or transmission reception point (TRP) may be interchangeable. A wireless multiple access communication system may include a number of distributed units (DUs) (e.g., edge units (EUs), edge nodes (ENs), radio heads (RHs), smart radio heads (SRHs), TRPs, etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

The UEs 120 (e.g., 120*x*, 120*y*, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 4.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a wireless device, the method comprising:
   selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the information indicative of the relative positions comprises reference signal time difference measurements (RSTDs) between the UE and each of the plurality of TRPs, wherein a first TRP is selected for the group of TRPs based on the first TRP having a signal quality between the UE and the first TRP that satisfies a threshold, and wherein remaining TRPs of the multiple TRPs are selected to maximize a number of the plurality of TRPs that satisfy the criteria; and
   communicating on an uplink using a single timing advance between the UE and the group of TRPs.

2. The method of claim 1, wherein the wireless device is the UE, and wherein communicating on the uplink comprises transmitting an uplink transmission to the group of TRPs using the single timing advance.

3. The method of claim 1, wherein the wireless device is the first TRP of the group of TRPs, and wherein communicating on the uplink comprises receiving an uplink transmission for the group of TRPs transmitted using the single timing advance from the UE.

4. The method of claim 1, wherein selecting the multiple TRPs of the group of TRPs is further based on information indicative of signal qualities between the UE and each of the plurality of TRPs.

5. The method of claim 1, wherein the wireless device is the UE, and further comprising:
   receiving positioning reference signals (PRSs) from the plurality of TRPs; and
   determining the RSTDs based on the received PRSs.

6. The method of claim 1, wherein the wireless device is the first TRP of the plurality of TRPs, and further comprising:
   receiving the RSTDs from the UE.

7. The method of claim 1, wherein the criteria is a defined maximum difference between RSTDs of the multiple TRPs of the group of TRPs, and wherein the multiple TRPs of the group of TRPs are further selected such that levels of communication delay between each of the multiple TRPs and the UE are within a defined delay range.

8. A wireless device comprising:
   a memory; and
   a processor coupled to the memory, the processor and memory configured to:
      select multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the information indicative of the relative positions comprises reference signal time difference measurements (RSTDs) between the UE and each of the plurality of TRPs, wherein the processor and memory are further configured to select a first TRP for the group of TRPs based on the first TRP having a signal quality between the UE and the first TRP that satisfies a threshold and to select remaining TRPs of the multiple TRPs to maximize a number of the plurality of TRPs that satisfy the criteria; and
      communicate on an uplink using a single timing advance between the UE and the group of TRPs.

9. The wireless device of claim 8, wherein the wireless device is the UE, and wherein the processor and memory being configured to communicate on the uplink comprises the processor and memory being configured to transmit an uplink transmission to the group of TRPs using the single timing advance.

10. The wireless device of claim 8, wherein the wireless device is the first TRP of the group of TRPs, and wherein the processor and memory being configured to communicate on the uplink comprises the processor and memory being configured to receive an uplink transmission for the group of TRPs transmitted using the single timing advance from the UE.

11. The wireless device of claim 8, wherein the processor and memory being configured to select the multiple TRPs of the group of TRPs comprises the processor and memory being configured to select the multiple TRPs further based on information indicative of signal qualities between the UE and each of the plurality of TRPs.

12. The wireless device of claim 8, wherein the wireless device is the UE, and wherein the processor and memory are further configured to:
   receive positioning reference signals (PRSs) from the plurality of TRPs; and
   determine the RSTDs based on the received PRSs.

13. The wireless device of claim 8, wherein the wireless device is the first TRP of the plurality of TRPs, and wherein the processor and memory are further configured to:
   receive the RSTDs from the UE.

14. The wireless device of claim 8, wherein the criteria is a defined maximum difference between RSTDs of the multiple TRPs of the group of TRPs, and wherein the processor and memory are further configured to select the multiple TRPs of the group of TRPs such that levels of communication delay between each of the multiple TRPs and the UE are within a defined delay range.

15. A wireless device comprising:
   means for selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the information indicative of the relative positions comprises reference signal time difference measurements (RSTDs) between the UE and each of the plurality of TRPs, wherein a first TRP is selected for the group of TRPs based on the first TRP having a signal quality between the UE and the first TRP that satisfies a threshold, and wherein remaining TRPs of the multiple TRPs are selected to maximize a number of the plurality of TRPs that satisfy the criteria; and
   means for communicating on an uplink using a single timing advance between the UE and the group of TRPs.

16. The wireless device of claim 15, wherein the wireless device is the UE, and wherein the means for communicating on the uplink comprises means for transmitting an uplink transmission to the group of TRPs using the single timing advance.

17. The wireless device of claim 15, wherein the wireless device is the first TRP of the group of TRPs, and wherein the means for communicating on the uplink comprises means for receiving an uplink transmission for the group of TRPs transmitted using the single timing advance from the UE.

18. The wireless device of claim 15, wherein the means for selecting the multiple TRPs of the group of TRPs is configured to select the multiple TRPs further based on information indicative of signal qualities between the UE and each of the plurality of TRPs.

19. The wireless device of claim 15, wherein the wireless device is the UE, and further comprising:
 means for receiving positioning reference signals (PRSs) from the plurality of TRPs; and
 means for determining the RSTDs based on the received PRSs.

20. The wireless device of claim 15, wherein the wireless device is the first TRP of the plurality of TRPs, and further comprising:
 means for receiving the RSTDs from the UE.

21. The wireless device of claim 15, wherein the criteria is a defined maximum difference between RSTDs of the multiple TRPs of the group of TRPs, and wherein the means for selecting the multiple TRPs comprises means for selecting the multiple TRPs such that levels of communication delay between each of the multiple TRPs and the UE are within a defined delay range.

22. A non-transitory computer-readable medium that comprises instructions that when executed by a wireless device, cause the wireless device to perform a method of wireless communication, the method comprising:
 selecting multiple transmission reception points (TRPs) of a plurality of TRPs to form a group of TRPs based on information indicative of relative positions between a user equipment (UE) and each of the plurality of TRPs such that the relative positions between the UE and the multiple TRPs satisfy a criteria, wherein the information indicative of the relative positions comprises reference signal time difference measurements (RSTDs) between the UE and each of the plurality of TRPs, wherein a first TRP is selected for the group of TRPs based on the first TRP having a signal quality between the UE and the first TRP that satisfies a threshold, and wherein remaining TRPs of the multiple TRPs are selected to maximize a number of the plurality of TRPs that satisfy the criteria; and
 communicating on an uplink using a single timing advance between the UE and the group of TRPs.

23. The non-transitory computer-readable medium of claim 22, wherein the wireless device is the UE, and wherein communicating on the uplink comprises transmitting an uplink transmission to the group of TRPs using the single timing advance.

24. The non-transitory computer-readable medium of claim 22, wherein the wireless device is the first TRP of the group of TRPs, and wherein communicating on the uplink comprises receiving an uplink transmission for the group of TRPs transmitted using the single timing advance from the UE.

25. The non-transitory computer-readable medium of claim 22, wherein the wireless device is the UE, and wherein the method further comprises:
 receiving positioning reference signals (PRSs) from the plurality of TRPs; and
 determining the RSTDs based on the received PRSs.

26. The non-transitory computer-readable medium of claim 22, wherein the wireless device is the first TRP of the plurality of TRPs, and wherein the method further comprises:
 receiving the RSTDs from the UE.

27. The non-transitory computer-readable medium of claim 22, wherein the criteria is a defined maximum difference between RSTDs of the multiple TRPs of the group of TRPs, and wherein the multiple TRPs of the group of TRPs are further selected such that levels of communication delay between each of the multiple TRPs and the UE are within a defined delay range.

* * * * *